United States Patent
Xu et al.

(10) Patent No.: US 9,857,471 B2
(45) Date of Patent: Jan. 2, 2018

(54) METHOD AND IMAGE PICK-UP SYSTEM FOR OBTAINING CLEAR IMAGES THROUGH THE RAIN, SNOW OR FOG

(71) Applicant: SHENZHEN PROTRULY ELECTRONICS CO., LTD, Shenzhen (CN)

(72) Inventors: Xinzhong Xu, Shenzhen (CN); Songwei Lin, Shenzhen (CN); Gang Long, Shenzhen (CN); Min Zhuang, Shenzhen (CN)

(*) Notice: Subject to any disclaimer, the term of this patent is extended or adjusted under 35 U.S.C. 154(b) by 808 days.

(21) Appl. No.: 14/445,423

(22) Filed: Jul. 29, 2014

(65) Prior Publication Data
US 2016/0363668 A1 Dec. 15, 2016

(30) Foreign Application Priority Data
Mar. 27, 2014 (CN) .......................... 2014 1 0118184

(51) Int. Cl.
| G01C 3/00 | (2006.01) |
| G01S 17/89 | (2006.01) |
| G01S 17/10 | (2006.01) |
| G01S 7/481 | (2006.01) |

(52) U.S. Cl.
CPC ............ G01S 17/89 (2013.01); G01S 7/4811 (2013.01); G01S 17/10 (2013.01); G01S 17/107 (2013.01)

(58) Field of Classification Search
CPC ........ G01S 17/107; G01S 17/10; G01S 17/89; G01S 7/4811
USPC .......................................................... 356/4.01
See application file for complete search history.

(56) References Cited

U.S. PATENT DOCUMENTS

| 4,920,412 A * | 4/1990 | Gerdt ................... G01S 17/107 348/31 |
| 5,034,810 A * | 7/1991 | Keeler .................... G01S 7/484 348/31 |
| 5,519,209 A * | 5/1996 | Rapoport ................ G01S 17/89 250/214 VT |
| 7,379,164 B2 * | 5/2008 | Inbar ...................... G01S 7/486 356/5.04 |
| 7,507,940 B2 * | 3/2009 | Fournier ................. G01S 17/89 250/201.4 |

* cited by examiner

*Primary Examiner* — Mark Hellner
(74) *Attorney, Agent, or Firm* — James M. Smedley LLC; James Michael Smedley, Esq.

(57) ABSTRACT

The present invention discloses a method and image pick-up system for obtaining clear images through the rain, snow or fog. The method includes a DSP processing module controls a laser pulse generating module output laser pulse signals with a default pulse width, and shut the laser pulse generating module down when a first default time arrives; when the laser pulse signals is being output, the DSP processing module controls an electronic shutter of an image pick-up device open after delaying for a second default time, and close the electronic shutter when a third default time arrives; wherein, the third default time is a lasting period of the default pulse width of the laser pulse signals; then, an FPGA module processes the images captured by the image pick-up device, and outputs clearer images, or makes the capturing distance farther but obtains clear images.

8 Claims, 2 Drawing Sheets

METHOD AND IMAGE PICK-UP SYSTEM FOR OBTAINING CLEAR IMAGES THROUGH THE RAIN, SNOW OR FOG

FIELD OF THE INVENTION

The present invention relates to the field of security monitoring technology, and more particularly, to a method and image pick-up system for obtaining clear images through the rain, snow or fog.

CROSS-REFERENCES TO RELATED APPLICATIONS

This application claims the priority of Chinese patent application no. 201410118184.1, filed on Mar. 27, 2014, the entire contents of all of which are incorporated herein by reference.

BACKGROUND

Usually, an image pick-up system does not have a laser pulse transmitting device installed, while some image pick-up systems having a laser pulse lighting function, emphasize on an image pick-up device technology of applying a laser pulse as a lighting source, and achieve trigger shootings onto a video output a CCD (Charge-coupled Device) which owns an external trigger function. Currently, the CCD control technology based on an FPGA (Field-Programmable Gate Array) is using the FPGA to generate a CCD driving schedule then controls the CCD to take photos.

Those image pick-up systems without the laser pulse transmitting device are impossible to catch scenes far away clearly in extreme weather, due to the low visibility caused by such as rain, snow or fog. Even for the image pick-up systems having the laser pulse lighting function, the laser pulses reflected back by the rain, snow or fog, mixed with the light reflected back by scenes far away, will cause the images undistinguished. Furthermore, since the rain, snow or fog is closer to the image pick-up system, the light signals got reflected back by them are stronger, so the majority part of those images captured in the image sensor (such as CCD, CMOS, etc) will be the rain, snow or fog, and it will be hard to see scenes far away clearly through the rain, snow and fog. Since the present image pick-up systems with laser pulse lighting functions are focusing on taking photos using the laser pulse as the lighting source only, and there are no backstage processing functions in the image pick-up systems, thus the present CCD controlling technology based on the FPGA in the image pick-up systems emphasizes driving the CCD, have no function of capturing clear images through the rain, snow or fog.

Therefore, the prior art needs to be improved and developed.

BRIEF SUMMARY OF THE DISCLOSURE

The technical problems to be solved in the present invention is, in view of the defects of the prior art, aiming at providing a method and image pick-up system for obtaining clear images through the rain, snow or fog, which makes capturing clear images through the rain, snow or fog possible.

The technical solution of the present invention to achieve the aims stated above is as follows: A method for obtaining clear images through the rain, snow or fog, wherein, it comprises: A, a digital signal processor (DSP) processing module controls a laser pulse generating module output laser pulse signals with a default pulse width, and shuts the laser pulse generating module down when a first default time arrives; B, when the laser pulse generating module is outputting the laser pulse signals, the DSP processing module controls an electronic shutter of an image pick-up device open after delaying for a second default time period, and shuts down the electronic shutter when a third default time arrives; wherein, the third default time is a lasting period of the default pulse width of the laser pulse signals; and C, processing video images captured by the image pick-up device through a field-programmable gate array (FPGA) module, so as to make output images clearer, or make a capturing distance farther but obtain clear images; then go back to the step A.

The said method for obtaining clear images through the rain, snow or fog, wherein, the said step C specifically comprises: C11, weighted processing the video images of default frames captured by the image pick-up device, and obtaining an image pixel average value of the video images of the default frames; C12, filtering process the video images of the default frames; and C13, extracting a pixel information from each frame video image, and combining the video images of the default frames into one video image for output.

The said method for obtaining clear images through the rain, snow or fog, wherein, the said step C13 specifically comprises: C131, obtaining pixel points from each frame video image, and extracting preferable pixel information among each frame video image, while discarding that of poor pixel information; and C132, combining the video images of the default frames into one video image for output; then going back to the step A.

The said method for obtaining clear images through the rain, snow or fog, wherein, the said step C specifically comprises: C21, deciding a video image processing cycle of the FPGA module, based on a video image capturing rate of the image pick-up device and a video image outputting rate of the FPGA module; C22, during each video image processing cycle, the capturing distance gradually increases and changes based on a unit of 10 meters, controlled by the DSP processing module; and C23, after one video image processing cycle is finished, combining the video images after overlying and filtering processes in the video image processing cycle into one frame video image for output; then going back to the step A.

The said method for obtaining clear images through the rain, snow or fog, wherein, before the step A, it also comprises: setting up the capturing distance and a capturing range of the image pick-up device and a processing mode of the FPGA module.

The said method for obtaining clear images through the rain, snow or fog, wherein, the said second default time is obtained by calculating through the following formula:

$$t = 2 \times H \times r/c$$

Wherein, the H is a frequency of the DSP processing module, the r is the capturing distance, and the r changes based on the unit of 10 meters, the c is the light speed.

The said method for obtaining clear images through the rain, snow or fog, wherein, the said default pulse width is obtained by calculating through the following formula:

$$t1 = 2 \times S/c$$

Wherein, the S is the capturing range, and the c is the light speed.

An image pick-up system, used to realize the said method for obtaining clear images through the rain, snow or fog, wherein, it includes: A DSP processing module, used to control a laser pulse generating module output laser pulse signals with a default pulse width, and shut the laser pulse generating module down when a first default time arrives; and, when the laser pulse generating module is outputting the laser pulse signals, the DSP processing module controls an electronic shutter of an image pick-up device open after delaying for a second default time, and shuts down the electronic shutter when a third default time arrives; wherein, the third default time is a lasting period of the default pulse width of the laser pulse signals; and an FPGA module, used to process video images captured by the image pick-up device, then output clearer images, or make a capturing distance farther but obtain clear images.

The said image pick-up system, wherein, the said FPGA module includes: a weighted processing unit, used to weighted process the video images of default frames captured by the image pick-up device, and obtain an image pixel average value of the video images of the default frames; a filtering unit, used to filter processing the video images of the default frames; and an images combination unit, used to extract a pixel information from each frame video image, and combine the video images of the default frames into one video image for output.

The said image pick-up system, wherein, the said FPGA module further includes: a video image processing cycle obtaining unit, used to decide a video image processing cycle of the FPGA module, based on a video image capturing rate of the image pick-up device and a video image outputting rate of the FPGA module; an automatic adjusting unit, used to gradually increase and change a capturing distance based on a unit of 10 meters, controlled by the DSP processing module, during each video image processing cycle; and an image processing unit, used to combine the video images after overlying and filtering processes in the video image processing cycle, into one video image for output after one video image processing cycle is finished.

Comparing to the prior art, the method and an image pick-up system of obtaining clear images through the rain, snow or fog, as provided in the present invention, wherein, the DSP processing module controls the laser pulse generating module output the laser pulse signals with the default pulse width, and shut the laser pulse generating module down when the first default time arrives; then, when the laser pulse generating module is outputting the laser pulse signals, the DSP processing module controls the electronic shutter of the image pick-up device open after delaying for the second default time period, and closes the electronic shutter when the third default time arrives; wherein, the third default time is the lasting period of the default pulse width of the said laser pulse signals; then, the FPGA module processes the video images captured by the image pick-up device, and outputs clearer images, or obtains clear video images from a farther capturing distance. The present invention can obtain clear images through the rain, snow or fog, Further, it can expand the capturing range. It can to be widely applied to all fields including actual civilian or military practices.

DETAILED DESCRIPTION

The present invention provides a method and an image pick-up system for obtaining clear images through the rain, snow or fog, in order to make the purpose, technical solution and the advantages of the present invention clearer and more explicit, further detailed descriptions of the present invention is stated here, referencing to the attached drawings and some embodiments of the present invention. It should be understood that the detailed embodiments of the invention described here are used to explain the present invention only, instead of limiting the present invention.

The present invention captures images through a high speed image pick-up system, and achieves the function of picturing through the rain, snow or fog, after FPGA processing. It is different to a current image pick-up method of using a pulsed laser to illuminate, as emphasized by a current pulsed laser lighting image pick-up system. Please refer to FIG. 1, which is a flow chart of a method for obtaining clear images through the rain, snow or fog as described the present invention.

Figure 1:
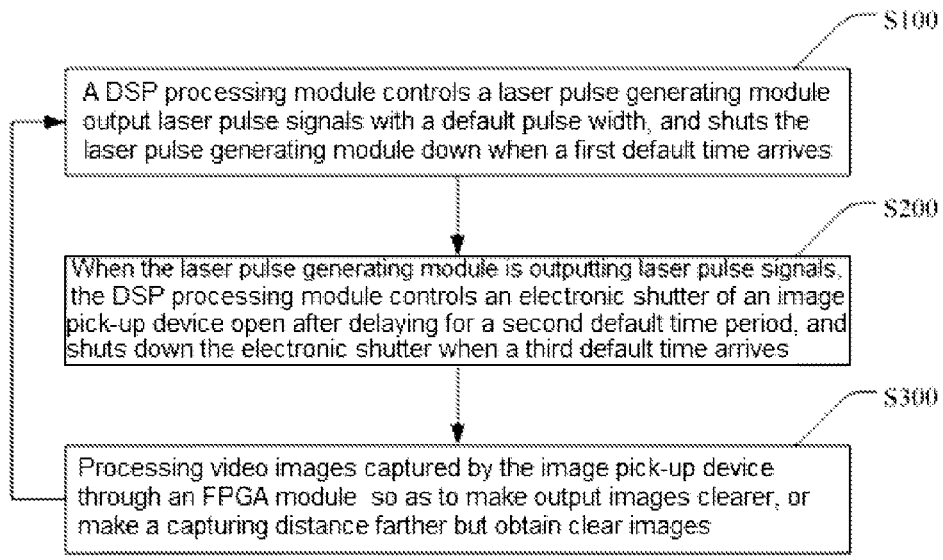
FIG. 1 illustrates a flow chart of a method for obtaining clear images through the rain, snow or fog in the present invention.

As shown in FIG. 1, the method for obtaining clear images through the rain, snow or fog as described in the present invention, comprising:

S100, a DSP processing module controls a laser pulse generating module output laser pulse signals with a default pulse width, and shuts the laser pulse generating module down when a first default time arrives;

S200, when the laser pulse generating module is outputting laser pulse signals, the DSP processing module controls an electronic shutter of an image pick-up device open after delaying for a second default time period, and shuts down the electronic shutter when a third default time arrives; wherein, the third default time is a lasting period of the default pulse width of the laser pulse signals;

S300, processing video images captured by the image pick-up device through an FPGA module, so as to make output images clearer, or make a capturing distance farther but obtain clear images; then go back to the step S100, to obtain images in the next cycle.

The present invention uses the DSP processing module to control outputting laser pulses, delaying for a time t, and opening the electronic shutter of the image pick-up device. Then captures images through a high speed image sensor (such as CCD, CMOS, etc), followed by FPGA processing, and finally, achieves capturing images through the rain, snow or fog. The present invention is able to capture clear video images through the rain, snow or fog, and expand the capturing range, it is a great progress in the image pick-up field.

Before the step S100, the method for obtaining clear images through the rain, snow or fog further comprises: setting up the capturing distance, a capturing range of the image pick-up device and a processing mode of the FPGA module. When the image pick-up system starts, every system module and variable also initialize, as well as an external interrupt service program, a timer interrupt program and else starts. Wherein, the external interrupt service program is mainly used to make a human-computer interaction device receive human-computer interaction control commands, and zero clear an interrupt flag, as well as returning interrupt signals to the DSP processing module and the FPGA module. The timer interrupt program is mainly used to achieve the control to the laser pulse and the electronic shutter, and labeling the time points of every message, such as labeling the laser pulse signals output time point, the first default time, the second default time, the third default time and so on.

In a specific implementation, the default pulse width t1 is self settable, which is able to be obtained by calculating through the following formula:

$$t1 = 2 \times S/c$$

Wherein, the S is the capturing range, the c is the light speed. From the formula, it is possible to see that, the larger the capturing range S is, the larger the default pulse width t1 will be, which means, the longer the pulse signal lasts.

Figure 2:
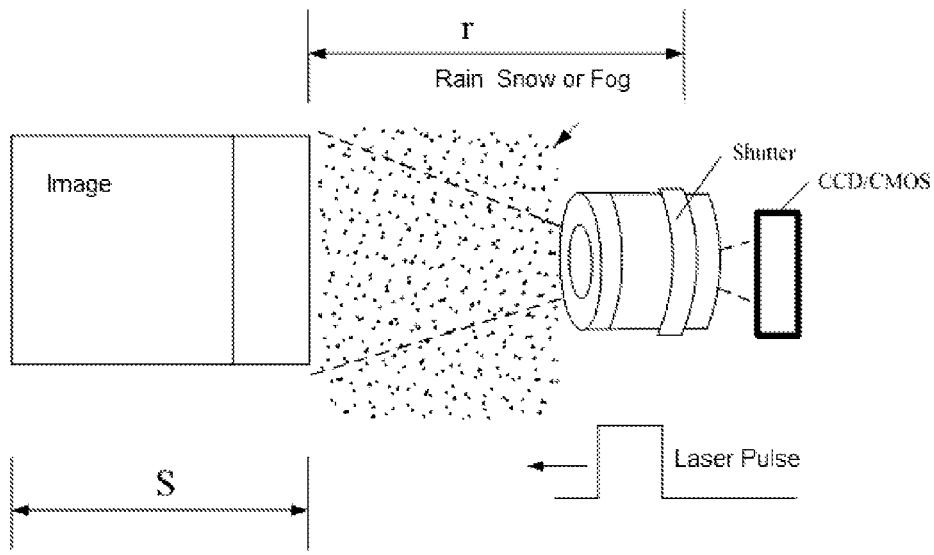
FIG. 2 illustrates a schematic diagram of capturing images through the rain, snow or fog, as in the method for obtaining clear images through the rain, snow or fog, in the present invention.
Figure 3:
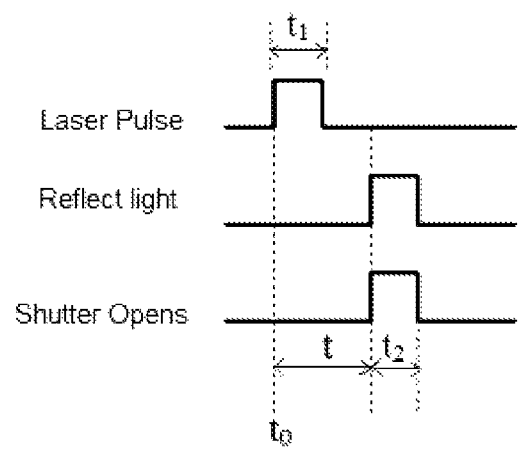
FIG. 3 illustrates a schematic diagram of a timing schedule of controlling a laser pulse and an electronic shutter, as in the method for obtaining clear images through the rain, snow or fog, in the present invention.

In the step S100, the DSP processing module controls the laser pulse generating module output the laser pulse signals with the default pulse width, and labels a time point t0 when the laser pulse signals send out, shown as FIG. 2 and FIG. 3, then shuts down the laser pulse generating module when the first default time arrives, and stops the laser pulse signals outputting, waits for the next start of the laser pulse generating module. Wherein, the time point to shut down the laser pulse signals is t0+t1, that is, turns off the laser pulse generating module after the laser pulse signals have been sent out for a period of the first default time.

In the step S200, a start point of the second default time is the time point when the electronic shutter opens, shown as FIG. 3, it is the same as a time of the reflecting light of the laser pulse signals starts, and the second default time t is obtained by calculating through the following formula:

$$t = 2 \times H \times r/c$$

Wherein, the H is a frequency of the DSP processing module, the r is the capturing distance, and the r changes based on a unit of 10 meters, the c is the light speed ($c = 3 \times 10^8$ m/s).

In the present embodiment, the DSP processing module is using a DSP processor with a basic frequency of 500 MHz or up. Taking the DSP processing module with 500 MHz basic frequency for example, the second default time is $500 \times 10^6 \times [20/(3 \times 10^8)] = 33$, that is, the time when the DSP processing module controls the electronic shutter open, needs to be 33 basic frequency cycles of the DSP processing module before opening the electronic shutter, followed by capturing the video images through the high speed image sensor, while the current DSP processing modules with 500 MHz basic frequencies totally have the processing ability.

A key improvement of the present invention is, managing the open and close time points of the electronic shutter, shown as FIG. 3, during the time period of t0~t0+t, if the shutter opens, after being sent out, the laser pulse signals will be reflected back when meeting with the rain, snow or fog, it will be mixed with the light reflected back by scenes far away, and cause the images undistinguished. Also, since the rain, snow or fog is closer to the image pick-up system, the light signals reflected back are stronger, so the majority part of the images captured in the image sensor (such as CCD, CMOS, etc) will be the rain, snow or fog, and it is hard to see scenes far away clearly through the rain, snow or fog. Thus in the present invention, the shutter is kept closing during the period from t0 to t0+t, timing gets started from the time point t0, when the laser pulse is sent out, and delays for the second default time t (t and t1 are independent from each other), before the shutter gets open. In the present embodiment, an opening time length of the shutter is t2, and t2=t1, thus a closing time point of the shutter is: t0+t+t2.

The present invention has not only controlled the time for electronic shutter to open and close exactly, but also processing the images captured by the video sensor in a backstage, which is able to make the images output clearer, or automatically controlled the capturing distance farther but for clear images, and output the video images at a standard frequency of 25 frames/second. That is, the high speed image sensor captures images at a speed of 10K frames/second, while the standard images output frequency of the image pick-up system (i.e., the FPGA module) is 25 frames/second only, that means, the FPGA module outputs one image every 100 us, that is, the FPGA module outputs one image when every 400 frame images captures by the image sensor.

The FPGA module can process the images captured in the image sensor through multiple methods. While one processing method is, combining every 400 frames into one image, although the capturing range S does not change before and after the combinations, the legibility of the images is better. The steps in details are shown as follows, firstly, weighted processing video images of default frames captured by the image pick-up device, and obtaining an image pixel average value of the video images of the default frames; secondly, filtering process the video images of the default frames; thirdly, extracting a pixel information from each frame video image, and combining the video images of the default frames into one video image for output. In the present embodiment, the number of the video images of the default frames is 400 frame video images.

Extracting the pixel information from each frame video image, and combining the video images of the default frames into one video image for output, which includes: obtaining pixel points from each frame video image, and extracting preferable pixel information among each frame video image, while discarding that of poor pixel information; then, combining the video images of the default frames into one video image for output; then going back to the step S100, waiting for the next output of the laser pulse signals from the laser pulse generating module, controlled by the DSP processing module. While the preferable pixel information means those pixels whose values have exceeded the default threshold and all information of other pixels left are discarded.

Another processing method provided by the present invention is, the FPGA module makes the capturing distance farther through the rain, snow or fog but makes the images clearer, its realization process is: firstly, based on a video image capturing rate of the image pick-up device and a video image outputting rate of the FPGA module, deciding an images processing cycle of the FPGA module; secondly, during each video image processing cycle, the capturing distance gradually increases and changes based on the unit of 10 meters, controlled by the DSP processing module; thirdly, after one video image processing cycle is finished, combining the video images after overlying and filtering processes in the video image processing cycle into one video image for output; then going back to the step S100.

Figure 4:
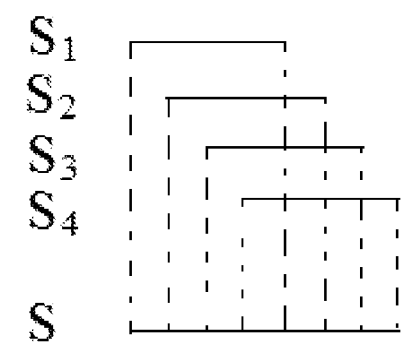
FIG. 4 illustrates a schematic diagram of a synthesis of capturing ranges, as described in the method for obtaining clear images through the rain, snow or fog, provided in the present invention.

Please also refer to FIG. 2 up to FIG. 4, suppose the laser pulse width t1 is unchanged, when the capturing distance r is unchanged, the capturing range S is also unchanged, i.e., S1=S2=S3=S4 . . . . If the image sensor captures images at a speed of 10K frames/second, and the video images output frequency of the image pick-up system is 25 frames/second, therefore, the present invention adopts an image processing cycle covering 400 frames, and the capturing distance r increases and changes at the unit of 10 meters, automatically controlled by the DSP processing module during each image processing cycle, while the image capturing range S1, S2, S3, S4, . . . of the 400 frames in one image processing cycle is also moving farther accordingly. Then, when the image processing cycle finishes, combining and filtering the images of 400 frames into one image, thus the capturing range is changed into S and the capturing distance is made farther, as shown in FIG. 4, the current capturing range S is increased comparing to the capturing ranges S1, S2, S3, S4 . . . before combining, thus a clearer video image is able to be obtained.

It is for sure that, in the present invention, the FPGA module is able to process the image data in different ways, as long as obtaining clear images through the rain, snow or fog.

Figure 5:
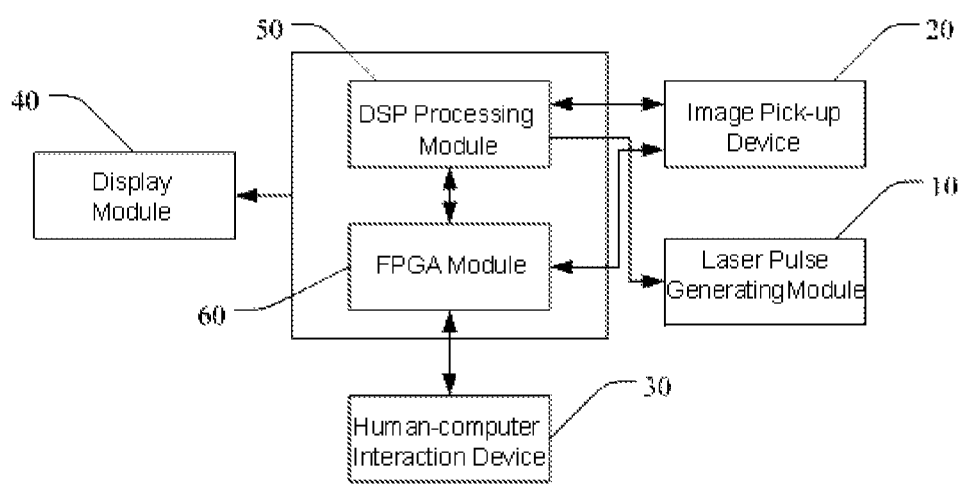
FIG. 5 illustrates a block diagram of an image pick-up system used to realize the method for obtaining clear images through the rain, snow or fog, as provided in the present invention.

Based on the said method for obtaining clear images through the rain, snow or fog, the present invention has also provided an image pick-up system, please refer to FIG. 5, which is a block diagram of the image pick-up system as in the method for obtaining clear images through the rain, snow or fog, in the present invention.

Shown in FIG. 5, the image pick-up system in the present invention includes: a laser pulse generating module 10, an image pick-up device 20, an human-computer interaction device 30, a display module 40, a DSP processing module 50 and an FPGA module 60, wherein, the DSP processing module 50 and the FPGA module 60 are integrated in one chip, while the laser pulse generating module 10, the image pick-up device 20, the human-computer interaction device 30 and the display module 40 are all currently existing functional modules. While the image pick-up device 20 includes an image sensor, an image pick-up device lens, an electronic shutter and more.

In the present embodiment, the DSP processing module 50 connects to the laser pulse generating module 10, the image pick-up device 20 and the FPGA module 60, used to control the laser pulse generating module 10 output laser pulse signals with a default pulse width, and shut the laser pulse generating module 10 down when a first default time arrives; and, when the laser pulse generating module 10 outputs the laser pulse signals, the DSP processing module 50 controls the electronic shutter of the image pick-up device 20 open after delaying for a second default time, and shuts down the electronic shutter when a third default time arrives; wherein, the third default time is a lasting period of the default pulse width of the laser pulse signals.

The said FPGA module 60 connects to the image pick-up device 20, the human-computer interaction device 30 and the display module 40, makes the output images clearer, or makes the capturing distance farther but obtaining clear video images.

The said human-computer interaction device 30 is used to setup the capturing distance and a capturing range of the image pick-up device 20, as well as the processing mode of the FPGA module 60 and more. The processing mode settings of the FPGA module could be using the two processing modes mention above, or other processing modes, as long as it is able to obtain clear images.

During a specific implementation, the said FPGA module 60 includes: a weighted processing unit, a filtering unit and an image combination unit. Wherein, the weighted processing unit is used to weighted process video images of default frames captured by the image pick-up device 20, and obtain an image pixel average value of the video images of the default frames. The said filtering unit is used to filter the video images of the default frames. While the images combination unit is used to extract an image pixel information from each video frame, and combine the video images of the default frames into one video image for output. Please refer to the above said embodiments for details.

Since the FPGA module 60 has multiple work modes, thus the FPGA module 60 also includes: an image processing cycle obtaining unit, an automatic adjusting unit and an image processing unit. Wherein, the image processing cycle obtaining unit is used to decide the image processing cycle of the FPGA module 60, based on the video image capturing rate of the image pick-up device 20 and the video image outputting rate of the FPGA module 60. The automatic adjusting unit is used to gradually increase and change the capturing distance based on a unit of 10 meters controlled by the DSP processing module 50 during each video image processing cycle. The image processing unit is used to combine the video images after overlying and filtering processes in the video image processing cycle into one video image for output after one video image processing cycle is finished. Please refer to the above said embodiments for details.

In summary, the present invention can obtain clear images through the rain, snow or fog, and expand the capturing range, which is a big progress in the video monitoring field, and it is able to be widely applied to all fields including civilian, military practices and other fields. Also, the present invention increases the clarity of images without increasing the hardware cost, it is suitable for spreading and applications.

It should be understood that, the application of the present invention is not limited to the above examples listed. It will be possible for a person skilled in the art to make modifications or replacements according to the above descriptions, which shall all fall within the protection scope of the appended claims of the present invention.

What is claimed is:
1. A method for obtaining clear images through the rain, snow or fog, wherein, the method comprises the steps of:
(A) controlling via a digital signal processor (DSP) processing module a laser pulse generating module to output laser pulse signals with a default pulse width, and shutting the laser pulse generating module down when a first default time period arrives;
(B) controlling via the DSP processing module, when the laser pulse generating module is outputting the laser pulse signals, an electronic shutter of an image pick-up device, to open after delaying for a second default time period, and shutting down the electronic shutter when a third default time period arrives, wherein the third default time period is the period of time that the default pulse width of the laser pulse signals lasts; and
(C) processing a plurality of video images captured by the image pick-up device through a field-programmable gate array (FPGA) module, so as to make the video images of the output clearer, or increase a capturing distance which obtains clear images;

wherein step C comprises the steps of:
weighted processing of the video images of a plurality of default frames captured by the image pick-up device, and obtaining an image pixel average value of the video images of the default frames;
processing the video images of the default frames by filtering; and
extracting a pixel information from each frame of the video images, and combining the video images of the default frames into one video image for output.

2. The method of claim 1, wherein, the extracting step of step C further specifically comprises:
obtaining pixel points from each frame of the video images, and extracting preferable pixel information from each frame, while discarding that of poor pixel information; and
combining the video images of the default frames into one video image for output; then going back to the step A.

3. The method of claim 1, wherein, step C further specifically comprises:
determining a video image processing cycle of the FPGA module, based on a video image capturing rate of the image pick-up device and a video image outputting rate of the FPGA module;
(C22), during each video image processing cycle, increasing the capturing distance gradually in increments of 10 meters, controlled by the DSP processing module; and
after one video image processing cycle is finished, combining the video images after filtering and extracting processes in the video image processing cycle into one frame of the video images for output; then going back to the step A.

4. The method of claim 1, further comprising the step of setting up the capturing distance, a capturing range of the image pick-up device, and a processing mode of the FPGA module prior to step A.

5. The method of claim 1, wherein the second default time is calculated by the following formula:

$$t=2\times H\times r/c;$$

wherein t is the second default time, H is a frequency of the DSP processing module, r is the capturing distance, and c is the light speed;
and wherein r changes in increments of 10 meters.

6. The method of claim 1, wherein, the default pulse width is calculated by the following formula:

$$t1=2\times S/c$$

wherein t1 is the default pulse width, S is the capturing range, and c is the light speed.

7. An image pick-up system for obtaining clear images through the rain, snow or fog, said system comprising:
a digital signal processor (DSP) processing module, used to control a laser pulse generating module output laser pulse signals with a default pulse width, and shut the laser pulse generating module down when a first default time period arrives, and, when the laser pulse generating module is outputting the laser pulse signals, the DSP processing module controls an electronic shutter of an image pick-up device to open after delaying for a second default time period, and to shut down the electronic shutter when a third default time period arrives;
wherein the third default time is a period of time that the default pulse width of the laser pulse signals lasts; and
an FPGA module, used to process video images captured by the image pick-up device and to output clearer images, or increase a capturing distance which obtains clear images;
wherein, the FPGA module comprises:
a weighted processing unit, used for weighted processing of the video images of a plurality of default frames captured by the image pick-up device, and obtain an image pixel average value for the video images of the default frames;
a filtering unit, used for filter processing of the video images of the default frames; and
an images combination unit, used to extract a pixel information from each frame of the video images, and combine the video images of the default frames into one video image for output.

8. The system according to claim 7, wherein, the FPGA module further comprises:
a video image processing cycle obtaining unit, used to determine a video image processing cycle of the FPGA module based on a video image capturing rate of the image pick-up device and a video image outputting rate of the FPGA module;
an automatic adjusting unit, used to gradually increase a capturing distance in increments of 10 meters, controlled by the DSP processing module, during each video image processing cycle; and
an image processing unit, used to combine the video images after filtering and extracting processes in the video image processing cycle into one video image for output after one video image processing cycle is finished.

* * * * *